(12) United States Patent
Narusaki et al.

(10) Patent No.: US 6,854,310 B2
(45) Date of Patent: Feb. 15, 2005

(54) DEVICE FOR CORRECTING CIRCUMFERENTIAL LENGTH OF METAL RING

(75) Inventors: Yuji Narusaki, Sayama (JP); Tomotsugu Takahashi, Sayama (JP); Katsuyuki Nakajima, Sayama (JP); Takehisa Kimura, Sayama (JP); Masao Nitta, Sayama (JP); Yoshiharu Watabe, Sayama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 15 days.

(21) Appl. No.: 10/415,995

(22) PCT Filed: Oct. 19, 2001

(86) PCT No.: PCT/JP01/09198

§ 371 (c)(1),
(2), (4) Date: Jun. 6, 2003

(87) PCT Pub. No.: WO02/38302

PCT Pub. Date: May 16, 2002

(65) Prior Publication Data

US 2004/0065128 A1 Apr. 8, 2004

(30) Foreign Application Priority Data

| Nov. 9, 2000 | (JP) | 2000-341811 |
| Nov. 9, 2000 | (JP) | 2000-341812 |
| Nov. 9, 2000 | (JP) | 2000-341813 |
| Nov. 9, 2000 | (JP) | 2000-341814 |
| Dec. 20, 2000 | (JP) | 2000-387840 |
| Jan. 12, 2001 | (JP) | 2001-004607 |
| May 29, 2001 | (JP) | 2001-159916 |

(51) Int. Cl.$^7$ ............................................. B21D 15/00
(52) U.S. Cl. ..................................... 72/110; 72/111
(58) Field of Search ........................ 72/107, 110, 111, 72/183, 205, 378

(56) References Cited

U.S. PATENT DOCUMENTS

| 4,164,134 A | | 8/1979 | Vollers | |
| 5,640,868 A | * | 6/1997 | Lauener | 72/110 |
| 6,318,140 B1 | * | 11/2001 | Yamagishi et al. | 72/110 |

FOREIGN PATENT DOCUMENTS

| EP | 1 092 488 A2 | 4/2001 |
| JP | 61-82910 A | 4/1986 |
| JP | 11-281342 A | 10/1999 |
| JP | 11-290971 A | 10/1999 |
| JP | 2000-266130 A | 9/2000 |

* cited by examiner

*Primary Examiner*—Ed Tolan
(74) *Attorney, Agent, or Firm*—Birch, Stewart, Kolasch & Birch, LLP

(57) ABSTRACT

An apparatus for correcting the circumferential length of a metal ring has a drive roller 2 and a driven roller 3 positionable closely to each other for training a metal ring W therearound, and a correcting roller 4 disposed between the drive roller 2 and the driven roller 3. The apparatus also has a first displacement applying unit for displacing the drive roller 2 and the driven roller 3 away from each other when the metal ring W is trained around the drive roller 2, the driven roller 3, and the correcting roller 4. The apparatus further includes spacers 21, 22 for spacing the drive roller 2 and the driven roller 3 a predetermined distance from each other when the drive roller 2 and the driven roller 3 are released from being displaced, a second displacement applying unit 27 for displacing the correcting roller 4 in a direction perpendicular to the direction in which the drive roller 2 and the driven roller 3 are displaced and also to extend the metal ring W, thereby to correct the circumferential length of the metal ring W, and a third displacement applying unit 91 for displacing the drive roller 2 and the driven roller 3 toward each other when the drive roller 2, the driven roller 3, and the correcting roller 4 are released from being displaced by the first and second displacement applying units 10, 27.

19 Claims, 14 Drawing Sheets

DEVICE FOR CORRECTING CIRCUMFERENTIAL LENGTH OF METAL RING

This application is the national phase under 35 U.S.C. §371 of PCT International Application No. PCT/JP01/09198 which has an International filing date of Oct. 19, 2001, which designated the United States of America.

TECHNICAL FIELD

The present invention relates to an apparatus for correcting the circumferential length of a metal ring for use in a metal belt for a continuously variable transmission.

BACKGROUND ART

Metal belts for use in continuously variable transmissions comprise a plurality of metal rings laminated together which have slightly different circumferential lengths. Heretofore, such a metal belt is manufactured as follows:

First, a thin sheet of ultrahigh strength steel such as maraging steel is bent into a loop, and has its opposite ends welded to each other, producing a ring-shaped drum. The drum is then sliced into metal rings of certain width. The metal rings are rolled into metal rings having standard circumferential lengths suitable for the respective layers of the metal belt. In this manner, as many kinds of metal rings as the number of the layers of the metal belt are obtained.

When the metal rings in those kinds are then subjected to a solution treatment, the circumferential lengths of the metal rings which have been rolled to the standard circumferential lengths suitable for the respective layers of the metal belt are varied due to different treating conditions. Therefore, the metal rings subjected to the solution treatment are treated in a circumferential length correcting process to correct their circumferential lengths into the standard circumferential lengths suitable for the respective layers of the metal belt.

The metal rings which have been treated in the circumferential length correcting process are then aged and nitrided to increase their hardness. The metal rings of the kinds having their circumferential lengths, which are slightly different from each other, corrected into the standard circumferential lengths suitable for the respective layers of the metal belt according to the circumferential length correcting process are laminated together, thus producing a metal belt for a continuously variable transmission.

When the metal belt is thus manufactured, if the variations of the circumferential lengths which have been caused by the solution treatment are left uncorrected, then many metal rings remain uncombinable with other metal rings at the time metal rings of different kinds are laminated together. Since the ultrahigh strength steel such as maraging steel is expensive and hence metal rings need to be manufactured with as high a yield as possible, the circumferential length correcting process is highly important for producing metal belts for continuously variable transmissions.

The applicant has already proposed an apparatus for performing the above circumferential length correcting process as disclosed in Japanese laid-open patent publication No. 11-290971. As shown in FIG. 15 of the accompanying drawings, the disclosed circumferential length correcting apparatus 101 has a drive roller 102 and a driven roller 103 for training a metal ring W therearound, and a correcting roller 104 disposed in a position intermediate between the drive roller 102 and the driven roller 103.

The drive roller 102 is rotatably supported by a drive roller support member 106 fixedly mounted on a base 105 of the circumferential length correcting apparatus 101. The drive roller 102 is coupled by a coupling mechanism, not shown, to a drive motor 107 which is a rotational drive source disposed behind the base 105. A guide block 109 is horizontally slidably mounted in engagement with a guide rail 108 fixedly mounted on the base 105. The guide block 109 supports thereon a driven roller support member 110 on which the driven roller 103 is rotatably supported.

The drive roller support member 106 and the driven roller support member 110 have a pair of spacers 111, 112 disposed respectively thereon and held in abutment against each other for spacing the drive roller 102 and the driven roller 103 from each other by a given interaxial distance. To the driven roller support member 110, there is connected one end of a wire 113 extending horizontally, whose other end is connected to counterweights 114a, 114b. The counterweights 114a, 114b are suspended vertically by rolls engaged by the wire 113. After the metal ring W is trained around the drive roller 102 and the driven roller 103, the driven roller 103 is displaced in a direction away from the drive roller 102 under the load of the counterweights 114a, 114b.

A frame 115 is vertically mounted on an end of the base 105 near the drive roller 102, and supports a hydraulic cylinder 116 on its upper portion. The correcting roller 104 is rotatably supported by a correcting roller support member 118 which is mounted on the end of a piston rod 117 of the hydraulic cylinder 116. The correcting roller 104 is displaceable by the hydraulic cylinder 116 in directions (vertical directions) perpendicular to the directions in which the driven roller 103 is displaceable.

A support column 119 is vertically mounted on an opposite end of the base 105 near the guide rail 108, and supports a first displacement sensor 120 for detecting displacements of the driven roller 103. A second displacement sensor 121 for detecting displacements of the correcting roller 4 is mounted on the frame 115 which supports the hydraulic cylinder 116.

The conventional circumferential length correcting apparatus 101 shown in FIG. 15 operates as follows: With the driven roller 103 brought closely to the drive roller 102, the metal ring W is trained around the drive roller 102, the driven roller 103, and the correcting roller 104. While the drive roller 102 is being rotated by the drive motor 107, the driven roller 103 is displaced in the direction away from the drive roller 102 under the load of the counterweights 114a, 114b, thus tensioning the metal ring W. The displacement sensor 120 now detects a displacement of the driven roller 103. The interaxial distance between the drive roller 102 and the driven roller 103 is determined from the detected displacement, and the actual circumferential length of the metal ring W is calculated as a function of the interaxial distance. The circumferential length correcting apparatus 101 calculates a displacement of the correcting roller 104 which is required to correct the circumferential length of the metal ring W into a desired circumferential length, from the difference between the determined actual circumferential length of the metal ring W and the desired circumferential length.

Then, while the drive roller 102 is being rotated, the hydraulic cylinder 116 urges and displaces the correcting roller 104 upwardly, plastically deforming the metal ring W.

At this time, the correcting ring 104 urges the correcting roller 104 upwardly until the displacement of the correcting roller 104 which is detected by the displacement sensor 121 reaches the calculated displacement of the correcting roller 104, after which the correcting ring 104 releases the correcting roller 104.

Then, the circumferential length correcting apparatus 101 displaces the driven roller 103 again in the direction away from the drive roller 102, and calculates the actual circumferential length of the metal ring W in the same manner as described above. The circumferential length correcting apparatus 101 determines the difference between the actual circumferential length after it has been corrected and the desired circumferential length. If the actual circumferential length as corrected is in conformity with the desired circumferential length, then the above operation is put to an end.

If the actual circumferential length as corrected is not in conformity with the desired circumferential length, then the above operation is repeated based on the actual circumferential length and the desired circumferential length. The circumferential length of the metal ring W can thus be corrected into the desired circumferential length.

In the circumferential length correcting apparatus 101, the correcting roller 104 may be displaced a certain distance with respect to the circumferential length, which is assumed to be substantially constant, of the metal ring W after it has been rolled and subjected to the solution treatment. In this case, the circumferential length of the metal ring W which is measured after the metal ring W has been trained around the drive roller 102, the driven roller 103, and the correcting roller 104 is compared with a standard circumferential length that is defined for the purpose of design or process management as the circumferential length of the metal ring W after it has been rolled and subjected to the solution treatment. The displacement of the correcting roller 104 is corrected based on the difference between the compared circumferential lengths.

By thus correcting the displacement of the correcting roller 104, it is possible to correct the actual circumferential length of the metal ring W easily and reliably into a desired circumferential length with the correcting roller 104 being displaced only once, and the yield of corrected metal rings can be increased.

With the above circumferential length correcting apparatus 101, however, for training the metal ring W around the drive roller 102, the driven roller 103, and the correcting roller 104, the driven roller 103 must be manually brought toward the drive roller 102. The driven roller 103 must also be manually brought toward the drive roller 102 for removing the metal ring W from the drive roller 102, the driven roller 103, and the correcting roller 104. Consequently, it has been desirous to fully automate all the steps of operation of the circumferential length correcting apparatus 101.

DISCLOSURE OF THE INVENTION

It is therefore an object of the present invention to provide a circumferential length correcting apparatus which is capable of automatizing all the steps of a process of correcting the circumferential length of a metal ring.

To achieve the above object, there is provided in accordance with the present invention an apparatus for correcting the circumferential length of a metal ring, comprising a drive roller and a driven roller positionable closely to each other for training a metal ring therearound, a correcting roller disposed between the drive roller and the driven roller, first displacement applying means for displacing the drive roller and the driven roller away from each other when the metal ring is trained around the drive roller, the driven roller, and the correcting roller, spacing means for spacing the drive roller and the driven roller a predetermined distance from each other when the drive roller and the driven roller are released from being displaced by the first displacement applying means, second displacement applying means for displacing the correcting roller in a direction perpendicular to the direction in which the drive roller and the driven roller are displaced by the first displacement applying means and also to extend the metal ring, thereby to correct the circumferential length of the metal ring while the drive roller and the driven roller are being spaced the predetermined distance from each other, and third displacement applying means for displacing the drive roller and the driven roller toward each other when the drive roller, the driven roller, and the correcting roller are released from being displaced by the first displacement applying means and the second displacement applying means.

The first displacement applying means comprises a wire having one end connected to one of the drive roller and the driven roller and extending horizontally from the other of the drive roller and the driven roller, a first counterweight connected to the other end of the wire and suspended vertically by a roll engaging the wire for displacing the drive roller or the driven roller through the wire, and a table for bearing the first counterweight upwardly to release the drive roller or the driven roller from being displaced by the first counterweight.

While the drive roller, the driven roller, and the correcting roller are being released from being displaced by the first displacement applying means and the second displacement applying means, the third displacement applying means displaces the drive roller, which is stopped against rotation, and the driven roller toward each other. The metal ring is then trained around the drive roller, the driven roller, and the correcting roller.

Then, the drive roller and the driven roller are released from being displaced by the third displacement applying means, and the first displacement applying means displaces the drive roller and the driven roller away from each other. The drive roller is rotated to keep the installed metal ring under tension. The actual circumferential length of the metal ring is calculated from the interaxial distance between the drive roller and the driven roller, and a corrective quantity is calculated based on the actual circumferential length of the metal ring.

Then, the drive roller and the driven roller are released from being displaced by the first displacement applying means, and while the drive roller is being rotated, the correcting roller is displaced by the second displacement applying means according to the corrective quantity calculated based on the actual circumferential length of the metal ring. The second displacement applying means displaces the correcting roller in the direction perpendicular to the direction in which the drive roller and the driven roller are displaced by the first displacement applying means and also to extend the metal ring. As a result, the metal ring is plastically deformed to correct its circumferential length.

When the process of correcting the circumferential length of the metal ring is finished, the correcting roller is released from being displaced by the second displacement applying means, and is returned to its original position. At the same time, the drive roller and the driven roller are displaced again away from each other by the first displacement applying means.

As described above, the first displacement applying means comprises a wire having one end connected to the drive roller or the driven roller and a first counterweight connected to the other end of the wire and suspended vertically. The displacement of the drive roller or the driven roller away from the other under the weight of the counterweight automatically follows the return of the correcting roller to its original position by the second displacement applying means.

When the correcting roller is returned to its original position by the second displacement applying means, the metal ring corrected for its circumferential length is thus prevented from being dislodged from the drive roller, the driven roller, and the correcting roller.

The drive roller is then stopped against rotation, and the correcting roller is released from being displaced by the second displacement applying means. The drive roller, which is stopped against rotation, and the driven roller are displaced again toward each other by the third displacement applying means. The metal ring corrected for its circumferential length is removed from being dislodged from the drive roller, the driven roller, and the correcting roller, and a new metal ring is trained around the drive roller, the driven roller, and the correcting roller, after which the above correcting process is repeated.

The circumferential length correcting apparatus according to the present invention is capable of fully automatizing the process of correcting the circumferential length of the metal ring.

For correcting the circumferential length of the metal ring, the drive roller and the driven roller are displaced away from each other by the first displacement applying means, and thereafter released from being displaced by the first displacement applying means. Then, the correcting roller is displaced by the second displacement applying means. However, upon displacement of the correcting roller, the drive roller and the driven roller tend to move abruptly toward each other, possibly into collision with each other.

According to the present invention, the apparatus further comprises braking means for preventing the drive roller and the driven roller from being abruptly moving toward each other when the metal ring is extended by the second displacement applying means. With the braking means, it is possible to prevent the drive roller and the driven roller from colliding with each other.

In the apparatus according to the present invention, the second displacement applying means comprises means for displacing the correcting roller along a vertical perpendicular bisector of an interaxial line between the drive roller and the driven roller which are spaced the predetermined distance by the spacing means.

Since the correcting roller is displaced along the vertical perpendicular bisector of the interaxial line between the drive roller and the driven roller which are spaced the predetermined distance by the spacing means, the interaxial distance between the correcting roller and the drive roller and the interaxial distance between the correcting roller and the driven roller are equal to each other at all times. As a result, equal loads are applied to the portion of the metal ring which extends between the correcting roller and the drive roller and the portion of the metal ring which extends between the correcting roller and the driven roller, Therefore, after the circumferential length of the metal ring has been corrected, its width, wall thickness, and other dimensions are highly accurate.

If the metal ring is used as a member of a metal belt for use in continuously variable transmission, then a standard circumferential length is defined for the purpose of design or process management as the circumferential length of the metal ring with respect to each layer of the metal belt. The metal ring is produced by bending a thin sheet of ultrahigh strength steel such as maraging steel into a loop, welding the opposite ends of the loop to form a drum, slicing the drum into a ring, and rolling the ring to a standard circumferential length for the corresponding layer of the metal belt. Metal rings thus produced are available in a plurality of as many kinds as the number of layers of the metal belt, and rolled to slightly different standard circumferential lengths given to the respective kinds of the metal rings. The actual circumferential lengths of the metal rings are varied under different conditions of a solution treatment process which follows the rolling process. However, the actual circumferential lengths of the metal rings and the standard circumferential lengths thereof are in certain corresponding relation to each other.

When metal rings to be corrected for their circumferential lengths are supplied in respective kinds, if the circumferential length of the metal ring that is supplied first is known, then it can be substantially corrected into the standard circumferential length even if the distance that the correcting roller is displaced by the second displacement applying means is constant. In the solution treatment process, however, a plurality of kinds of metal rings may possibly be treated together.

When the circumferential length correcting apparatus is supplied with a plurality of mixed kinds of metal rings to be corrected for their circumferential lengths, if the circumferential lengths of the supplied metal rings were uniformly corrected, then the corrective quantity with respect to a given standard circumferential length for a certain metal ring to be corrected for its circumferential length might exceed a limit for plastic deformation of the metal ring depending on the kind of the metal ring. The circumferential length of a metal ring to be corrected may be in excess of the given standard circumferential length therefor depending on the kind of the metal ring.

In view of the above drawbacks, the apparatus according to the present invention further comprises a first calculating unit for calculating the actual circumferential length of the metal ring to be corrected for the circumferential length thereof, a selecting unit for selecting a corrected standard circumferential length corresponding to the actual circumferential length of the metal ring which is calculated by the first calculating unit, and a second calculating unit for calculating a corrective quantity required to correct the circumferential length of the metal ring into the corrected standard circumferential length, wherein the second displacement applying means comprises means for displacing the correcting roller according to the corrective quantity calculated by the second correcting unit.

The first calculating unit calculates the actual circumferential length of the metal ring to be corrected for the circumferential length thereof. While the actual circumferential lengths of metal rings to be corrected for the circumferential lengths thereof are possibly varied due to different conditions of the solution treatment process following the rolling process, the actual circumferential lengths of the metal rings and the standard circumferential lengths thereof are in certain corresponding relation to each other, as described above.

The selecting unit selects a corrected standard circumferential length corresponding to the actual circumferential length of the metal ring which is calculated by the first calculating unit. When the corrected standard circumferential length is selected, the second calculating unit compares the actual circumferential length of the metal ring to be corrected and the selected corrected standard circumferential length with each other and calculates a corrective quantity required to correct the circumferential length of the metal ring into the corrected standard circumferential length. The second displacement applying means displaces the correcting roller according to the corrective quantity calculated by the second correcting unit, thus correcting the circumferential length of the metal ring into the selected standard circumferential length.

Even when the circumferential length correcting apparatus is supplied with each of a plurality of kinds of metal rings to be corrected for their circumferential lengths, metal rings of certain kinds and metal rings of other kinds which may possibly be treated together in the solution treatment process may be supplied directly to the circumferential length correcting process carried out by the circumferential length correcting apparatus. In this case, the corrective quantity with respect to a given standard circumferential length for a certain metal ring to be corrected for its circumferential length may exceed a limit for plastic deformation of the metal ring depending on the kind of the metal ring. The circumferential length of a metal ring to be corrected for its circumferential length may be in excess of the given standard circumferential length therefor depending on the kind of the metal ring. Thus, it may not be possible to obtain a metal ring having a given standard circumferential length after it has been corrected for its circumferential length.

In view of the above shortcomings, the apparatus according to the present invention further comprises a calculating unit for calculating the actual circumferential length of the metal ring to be corrected for the circumferential length thereof, and a selecting unit for selecting a corrected standard circumferential length corresponding to the actual circumferential length of the metal ring which is calculated by the calculating unit, wherein the first displacement applying means comprises means for releasing the drive roller and the driven roller from being displaced away from each other when the actual circumferential length of the metal ring as calculated by the calculating unit falls out of a range of the corrected standard circumferential length selected by the selecting unit.

When the actual circumferential length of the metal ring as calculated by the calculating unit falls out of the range of the corrected standard circumferential length selected by the selecting unit, the circumferential length of the metal ring cannot be corrected into the given standard circumferential length. At this time, with the apparatus according to the present invention, the first displacement applying means releases the drive roller and the driven roller from being displaced away from each other. Therefore, when the apparatus is supplied with a metal ring whose actual circumferential length before being corrected falls out of the range of the corrected standard circumferential length selected by the selecting unit, the apparatus can reliably discharge the supplied metal ring.

Metal belts for use in continuously variable transmissions comprise a plurality of metal rings laminated together which have slightly different circumferential lengths. Each of the metal rings should preferably have a an arcuate cross-sectional shape which is convex at a center thereof in a transverse direction thereof in order to keep the metal rings easily in the laminated state.

In the apparatus according to the present invention, the correcting roller should preferably have an outer circumferential surface having an arcuate cross-sectional shape which is convex at a center thereof in a transverse direction thereof.

When the correcting roller is displaced by the second displacement applying means to correct the circumferential length of the metal ring, the arcuate shape of the outer circumferential surface of the correcting roller is transferred to the metal ring, giving the metal ring the arcuate shape which is convex at the center in the transverse direction. When metal rings each having the above arcuate cross-sectional shape are laminated, they are easily kept in the laminated state because they engage each other at their center.

While the metal ring is being processed up to the solution treatment process, the metal ring may be deformed such that its laterally spaced circumferential edges have different circumferential lengths. If the metal ring thus deformed were trained around the drive roller, the driven roller, and the correcting roller and corrected for its circumferential length, then the laterally spaced regions of the metal ring would be processed to different extents, and the difference between the different circumferential lengths might possibly increase when the metal ring is subsequently aged or nitrided. With the correcting roller having the outer circumferential surface which is of an arcuate cross-sectional shape that is convex in the center in the transverse direction, the metal ring whose circumferential edges have different lengths tends to move from the center of the correcting roller to an edge thereof along the arcuate cross-sectional shape when the correcting roller is rotated. With the metal ring thus moved, a desired shape may not be imparted to the metal ring on the correcting roller, or the metal ring may possibly be dislodged from the correcting roller.

In the apparatus according to the present invention wherein the outer circumferential surface of the correcting roller has an arcuate cross-sectional shape that is convex in the center in the transverse direction, the driven roller, which is stopped against rotation, and the driven roller are displaced away from each other before the correcting roller is displaced by the second displacement applying means to correct the circumferential length of the metal ring. At this time, the relative displacement of the drive roller and the driven roller imparts a load to plastically deform the metal ring to equalize the lengths of the circumferential edges of the metal ring with each other.

In order to equalize the lengths of the circumferential edges of the metal ring with each other, the apparatus according to the present invention may have correcting roller tilting means for tilting the axis of the correcting roller depending on the difference between opposite circumferential edges of the metal ring.

With the above arrangement of the apparatus according to the present invention, the metal ring is trained around the drive roller, the driven roller, and the correcting roller, by first bringing the longer circumferential edge of the metal ring into engagement with these rollers. Then, the correcting roller tiling means tilts the axis of the correcting roller in a direction that counters the inclination of the metal ring in the transverse direction thereof.

The correcting roller is then displaced by the second displacement applying means to correct the circumferential length of the metal ring. Since the correcting roller is tilted in the direction that counters the inclination of the metal ring in the transverse direction thereof, the metal ring is extended more along the shorter circumferential edge thereof than along the longer circumferential edge thereof. As a consequence, the difference between the lengths of the circumferential edges of the metal ring is eliminated. The metal ring is thus easily corrected to equalize the lengths of the circumferential edges thereof.

The above and other objects, features, and advantages of the present invention will become apparent from the following description when taken in conjunction with the accompanying drawings which illustrate preferred embodiments of the present invention by way of example.

BEST MODE FOR CARRYING OUT THE INVENTION

Figure 1:
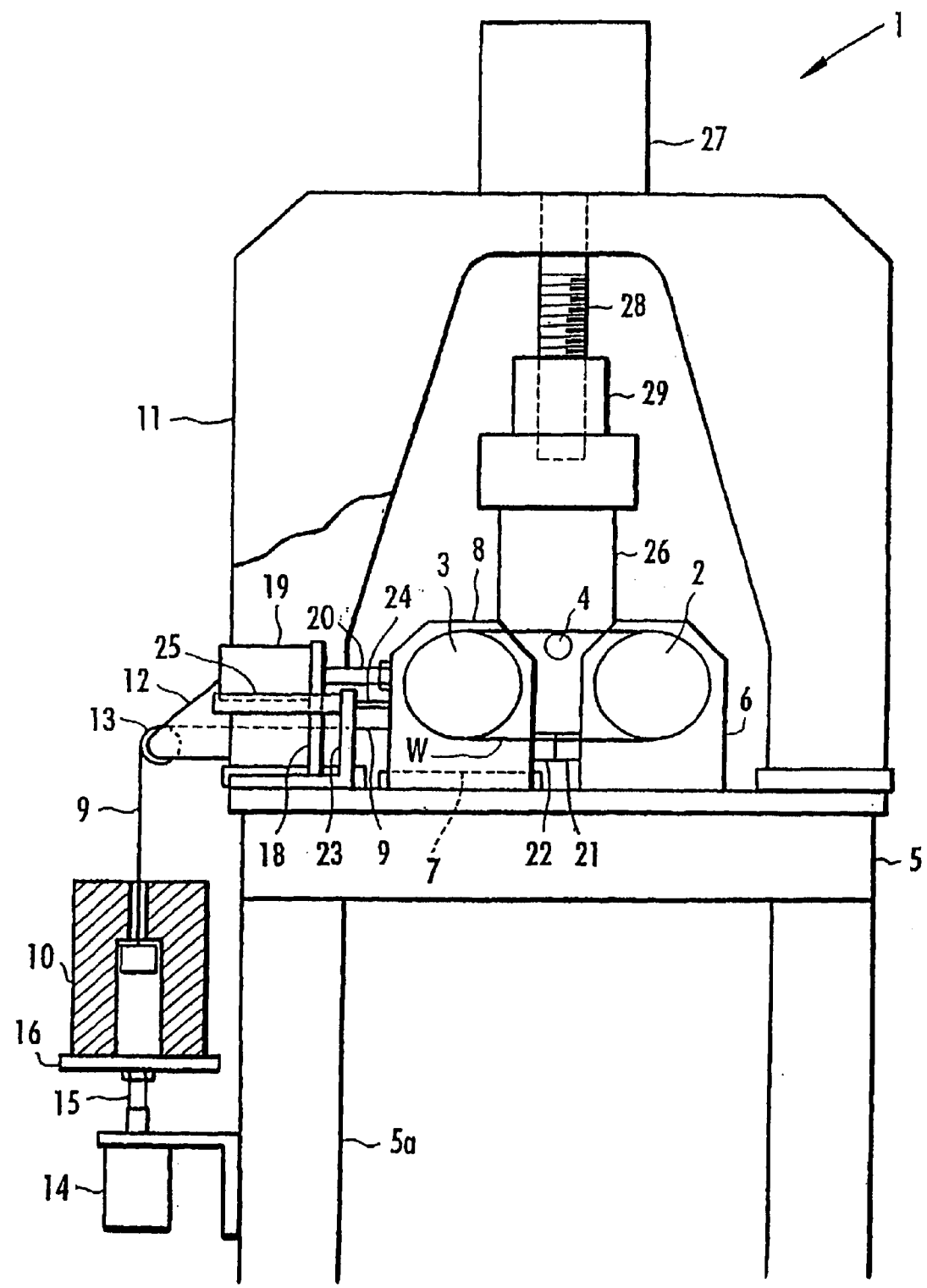
FIG. 1 is an elevational view of a circumferential length correcting apparatus according to an embodiment of the present invention.

An apparatus for correcting the circumferential length of a metal ring (hereinafter referred to as "circumferential length correcting apparatus") serves to correct the circumferential length of a metal ring as a member of a metal belt for use in a continuously variable transmission. The metal ring is produced by bending a thin sheet of ultrahigh strength steel such as maraging steel into a loop, welding the opposite ends of the loop to form a drum, slicing the drum into a ring, rolling the ring, and subjecting the rolled ring to a solution treatment. Metal rings thus produced are available in a plurality of as many kinds as the number of layers of the metal belt. Slightly different circumferential lengths are given to the respective kinds of the metal rings by the rolling process. However, the circumferential lengths of the kinds of the metal rings are varied by the solution treatment process following the rolling process. It is thus necessary to correct the circumferential lengths of the metal rings in order to produce a metal ring for use in a continuously variable transmission.

The circumferential length correcting apparatus 1 which serves to correct the circumferential length of the metal ring W has a drive roller 2 and a driven roller 3 for training the metal ring W therearound, and a correcting roller 4 disposed in a position intermediate between the drive roller 2 and the driven roller 3.

The drive roller 2 is rotatably supported by a drive roller support member 6 fixedly mounted on a base 5 of the circumferential length correcting apparatus 1. The drive roller 2 is rotatable by a drive motor, not shown, which is disposed behind the drive roller support member 6. A driven roller support member 8 is horizontally slidably mounted in engagement with a guide rail 7 fixedly mounted on the base 5. The driven roller 3 is rotatably supported on the driven roller support member 8.

A horizontally extending wire 9 has an end connected to the driven roller support member 8 and an opposite end connected to a first counterweight 10. The first counterweight 10 is vertically downwardly suspended by a roll 13 engaging the wire 9 and rotatably supported on a bracket 12 which is mounted on a proximal portion of a mount 11 vertically disposed on the base 5 near the driven roller 3. The driven roller 3 is displaceable away from the drive roller 2 when the driven roller support member 8 is slid along the guide rail 7 under the load of the first counterweight 10. When the first counterweight 10 is borne upwardly by a table 16 mounted on the tip end of a piston rod 15 of a cylinder 14 which is mounted on a leg 5a of the base 5, the first counterweight 10 releases the driven roller support member 8 from being displaced under the load thereof.

A cylinder 19 is mounted on a support column 18 vertically disposed on the base 5 and has a piston rod 20 connected to the driven roller support member 8. When the first counterweight 10 is borne upwardly by the table 16, releasing the driven roller support member 8 from the displacement under the weight of the first counterweight 10, the cylinder 19 causes the piston rod 20 to press the driven roller support member 8. Therefore, the driven roller 3 is displaceable in a direction toward the drive roller 2. The drive roller support member 6 and the driven roller support member 8 have a pair of spacers 11, 12 disposed respectively thereon and held in abutment against each other for spacing the drive roller 2 and the driven roller 3 from each other by a given interaxial distance.

A displacement sensor 25 having a probe 24 that is displaceable in directions parallel to the directions in which the driven roller 3 is displaceable is mounted on a support column 23 vertically disposed on the base 5. The tip end of the probe 24 is urged into abutment against the driven roller support member 8 by a spring member or the like, not shown, and displaceable in unison with the driven roller support member 8 for detecting displacements of the driven roller 3.

The correcting roller 4 is rotatably supported by a correcting roller support member 26. The correcting roller support member 26 is connected by a coupling 29 to a ball screw 28 which is coupled to the rotatable shaft of a servomotor 27 mounted on the mount 11. As a result, the correcting roller 4 is displaceable in directions perpendicular to the directions in which the driven roller 3 is displaceable, by a distance controlled by the servomotor 27 and the ball screw 28.

Figure 2:
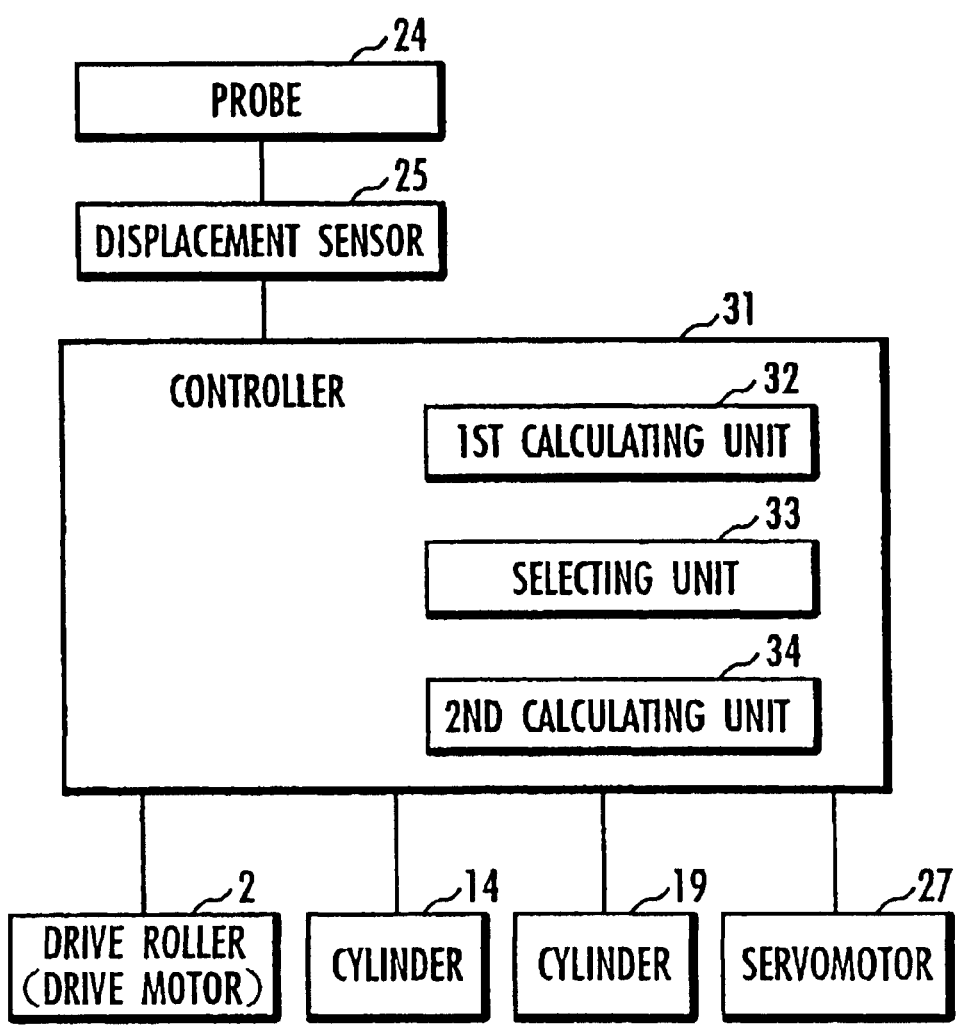
FIG. 2 is a block diagram of the circumferential length correcting apparatus shown in FIG. 1.

As shown in FIG. 2, the circumferential length correcting apparatus 1 has a controller 31 connected to a motor for rotating the drive roller 2, the cylinder 14 for moving the table 16 to bearing the first counterweight 10 upwardly, the cylinder 19 for displacing the driven roller support member 8 toward the drive roller 2, the servomotor 27 for displacing the correcting roller 4, and the displacement sensor 25 for displacing displacements of the driven roller support member 8. The controller 31 has a first calculating unit 32 for calculating the actual circumferential length of a supplied metal ring W, a selecting unit 33 for selecting a corrected standard circumferential length corresponding to the actual circumferential length of the metal ring W, and a second calculating unit 34 for calculating a corrective quantity with respect to the corrected standard circumferential length.

Operation of the circumferential length correcting apparatus 1 will be described below with reference to FIGS. 1 through 2. While the drive roller 2 and the driven roller 3 are being stopped against rotation, the controller 31 shown in FIG. 2 actuates the cylinder 14 to move the table 16 upwardly. The table 16 bears the first counterweight 10, releasing the driven roller support member 8 from the load of the first counterweight 10.

Then, the controller 31 actuates the cylinder 19 to press the driven roller support member 8, moving the driven roller 3 toward the drive roller 2 until the spacer 21 on the drive roller support member 6 and the spacer 22 on the driven roller support member 8 abut against each other.

A metal ring W of maraging steel which has been subjected to the rolling process and the solution treatment process is trained around the drive roller 2, the driven roller 3, and the correcting roller 4. For example, the metal ring W delivered from the previous processes is gripped by one or more pairs of fingers (not shown) that confront each other at a certain distance therebetween, and trained around the drive roller 2, the driven roller 3, and the correcting roller 4.

After the metal ring W is trained around the drive roller 2, the driven roller 3, and the correcting roller 4, the controller 31 energizes the drive motor to start rotating the drive roller 2, releases the driven roller support member 8 from being displaced by the cylinder 19, and releases the first counterweight 10 from being borne by the cylinder 14. The load from the first counterweight 10 is then imposed on the driven roller support member 8, which is slid along the guide rail 7 to displace the driven roller 3 away from the drive roller 2.

As a result, the metal ring W trained around the drive roller 2, the driven roller 3, and the correcting roller 4 is tensioned under the load (e.g., 20 kg) of the first counterweight 10. At this time, the displacement sensor 25 detects the displacement of the driven roller 3 with the probe 24, and supplies the detected displacement to the controller 31. From the displacement to the controller 31 detected by the displacement sensor 25, the first calculating unit 32 of the controller 31 determines the interaxial distance between the drive roller 2 and the driven roller 3, and calculates the actual circumferential length of the metal ring W as a function of the determined interaxial distance.

The circumferential length correcting apparatus 1 may occasionally be supplied with a plurality of mixed kinds of metal rings W which have been subjected to the solution treatment process following the rolling process, but not corrected for their circumferential lengths. The circumferential length correcting apparatus 1 enters the actual circumferential length of the metal ring W which has been calculated by the first calculating unit 32 into the selecting unit 33.

The actual circumferential lengths of metal rings W are varied because of different treating conditions of the solution treatment process. However, since the metal rings W have been given standard circumferential lengths for the respective kinds thereof which corresponds to the respective layers of the metal belt in the rolling process, the actual circumferential lengths of the metal rings W and the standard circumferential lengths thereof are in certain corresponding relation to each other even though the actual circumferential lengths of the metal rings W are varied due to the solution treatment process.

The selector 33 selects a standard circumferential length corresponding to the actual circumferential length of the metal ring W which has been calculated by the first calculating unit 32. The second calculating unit 34 then compares the actual circumferential length of the metal ring W with the selected standard circumferential length, and calculates a displacement to be given to the correcting roller 4 which is required to correct the circumferential length of the metal ring W into the standard circumferential length. The displacement to be given to the correcting roller 4 is calculated, taken into account the length by which the metal ring W springs back.

Then, the controller 31 actuates again the cylinder 14 to cause the table 16 to bear the first counterweight 10, releasing the driven roller support member 8 from the load of the first counterweight 10. At the same time, the controller 31 energizes the servomotor 27 to rotate the ball screw 28 to displace the correcting roller 4 supported on the correcting roller support member 26 into abutment against the metal ring W. Specifically, the ball screw 28 is rotated about its own axis to displace the correcting roller 4 upwardly by the displacement which has been calculated by the second calculating unit 34. At this time, the displacement by which the correcting roller 4 is displaced is controlled by the number of revolutions of the servomotor 27 and the ball screw 28.

When the actual displacement of the correcting roller 4 has reached the displacement calculated in view of the spring back of the metal ring W, the controller 31 maintains the displacement of the correcting roller 4 for several seconds in order to reduce the spring back of the metal ring W. Thereafter, the controller 31 reverses the servomotor 27 to return the correcting roller 4 to its original position. Upon return of the correcting roller 4 to its original position, the controller 31 de-energizes the servomotor 27.

When the correcting roller 4 is returned to its original position, the controller 31 actuates the cylinder 19 to displace the driven roller 3 away from the drive roller 2. Since the driven roller 3 is displaced under the weight of the first counterweight 10, the driven roller 3 is displaced automatically in unison with the return of the correcting roller 4 to its original position. Therefore, when the correcting roller 4 is returned to its original position, the metal ring W remains under tension around the drive roller 102, the driven roller 103, and the correcting roller 104, and is prevented from being dislodged from the circumferential length correcting apparatus 1.

With the circumferential length correcting apparatus 1 shown in FIG. 1, the correcting roller 4 may be displaced only once. However, after the correcting roller 4 is returned to its original position, the actual circumferential length of the metal ring W may be calculated in the same manner as described above, and the process of correcting the circumferential length may be repeated. The accuracy of the corrected circumferential length can be increased by thus repeating the process of correcting the circumferential length.

When the process of correcting the circumferential length is finished according to either one of the above sequences, the controller 31 stops the drive roller 2 against rotation, and actuates the cylinder 14 to cause the table 16 to bear the first counterweight 10, releasing the driven roller support member 8 from being displaced under the weight of the first counterweight 10. Then, the controller 31 actuates the cylinder 19 again to press the driven roller support member 8, thereby moving the driven roller 3 toward the drive roller 2.

The metal ring W whose circumferential length has been corrected is removed from the drive roller 102, the driven roller 103, and the correcting roller 104. The metal ring W can be removed by being gripped by the fingers described above.

The circumferential length correcting apparatus 1 may be selectively supplied with a metal ring W of a certain kind selected from the plural kinds of metal rings W. In this case, the standard circumferential length selected by the selecting unit 33 may be preset to the one corresponding to the metal ring W of the certain kind. However, a metal ring W of another kind may possibly be supplied, instead of the metal ring W of the certain kind, from the solution treatment process to the circumferential length correcting apparatus 1.

When the first calculating unit 32 calculates the actual circumferential length of the metal ring W, the controller 31 enters the calculated actual circumferential length into the selecting unit 33, and determines whether the actual circumferential length of the supplied metal ring W corresponds to the preset standard circumferential length or not. If the controller 31 confirms that the actual circumferential length of the supplied metal ring W corresponds to the preset standard circumferential length, then the second calculating unit 34 compares the actual circumferential length and the standard circumferential length with each other, calculates a displacement for the correcting roller 4, and corrects the circumferential length of the metal ring W in the same manner as described above.

If the actual circumferential length of the supplied metal ring W falls out of the range of the actual circumferential length corresponding to the preset standard circumferential length, then the controller 31 actuates again the cylinder 14 to cause the table 16 to bear the first counterweight 10, releasing the driven roller support member 8 from being displaced under the weight of the first counterweight 10. Then, the controller 31 stops the drive roller 2 against rotation, and actuates the cylinder 19 again to press the driven roller support member 8, thereby moving the driven roller 3 toward the drive roller 2. The metal ring W is removed from the drive roller 102, the driven roller 103, and the correcting roller 104. The metal ring W can be removed by being gripped by the fingers described above.

In the process of correcting the circumferential length of a metal ring W, which is performed on the circumferential length correcting apparatus 1, when the correcting roller 4 is displaced upwardly while the first counterweight 10 is being borne by the table 16 to release the driven roller support member 8 from being displaced under the load of the first counterweight 10, the driven roller support member 8 is abruptly displaced toward the drive roller 2, tending to bring the drive roller support member 6 and the driven roller support member 8 into collision with each other. However, the cylinder 19 whose piston rod 20 is connected to the driven roller support member 8 presents a resistance to the displacement of the driven roller support member 8 toward the drive roller 2, and serves as a braking means. As a result, the driven roller support member 8 is prevented from being abruptly displaced toward the drive roller 2, thus preventing unwanted collision between the drive roller support member 6 and the driven roller support member 8.

The circumferential length correcting apparatus 1 shown in FIG. 1 employs the cylinder 19 whose piston rod 20 is connected to the driven roller support member 8 as a means for moving the driven roller 3 toward the drive roller 2. However, a circumferential length correcting apparatus 41 according to another embodiment of the present invention as shown in FIG. 3 employs a second counterweight 43 connected to the driven roller support member 8 by a wire 42 as such a means for moving the driven roller 3 toward the drive roller 2.

In the circumferential length correcting apparatus 41, specifically, the wire 42 extends horizontally toward the drive roller support member 6, and has an end connected to the drive roller support member 8 and an opposite end coupled to the second counterweight 43. The second counterweight 43 is vertically downwardly suspended by a roll 45 engaging the wire 42 and rotatably supported on a bracket 44 which is mounted on a proximal portion of the mount 11 that is vertically disposed on the base 5 near the drive roller 2.

When the driven roller support member 8 is released from being displaced by the first counterweight 10, the driven roller 3 is slid along the guide rail 7 toward the drive roller 2 under the load (e.g., 5 kg) of the second counterweight 43. When the second counterweight 43 is borne upwardly by a table 48 mounted on the tip end of a piston rod 47 of a cylinder 46 which is mounted on a leg 5b of the base 5, the second counterweight 43 releases the driven roller support member 8 from being displaced under the load thereof.

Figure 3:
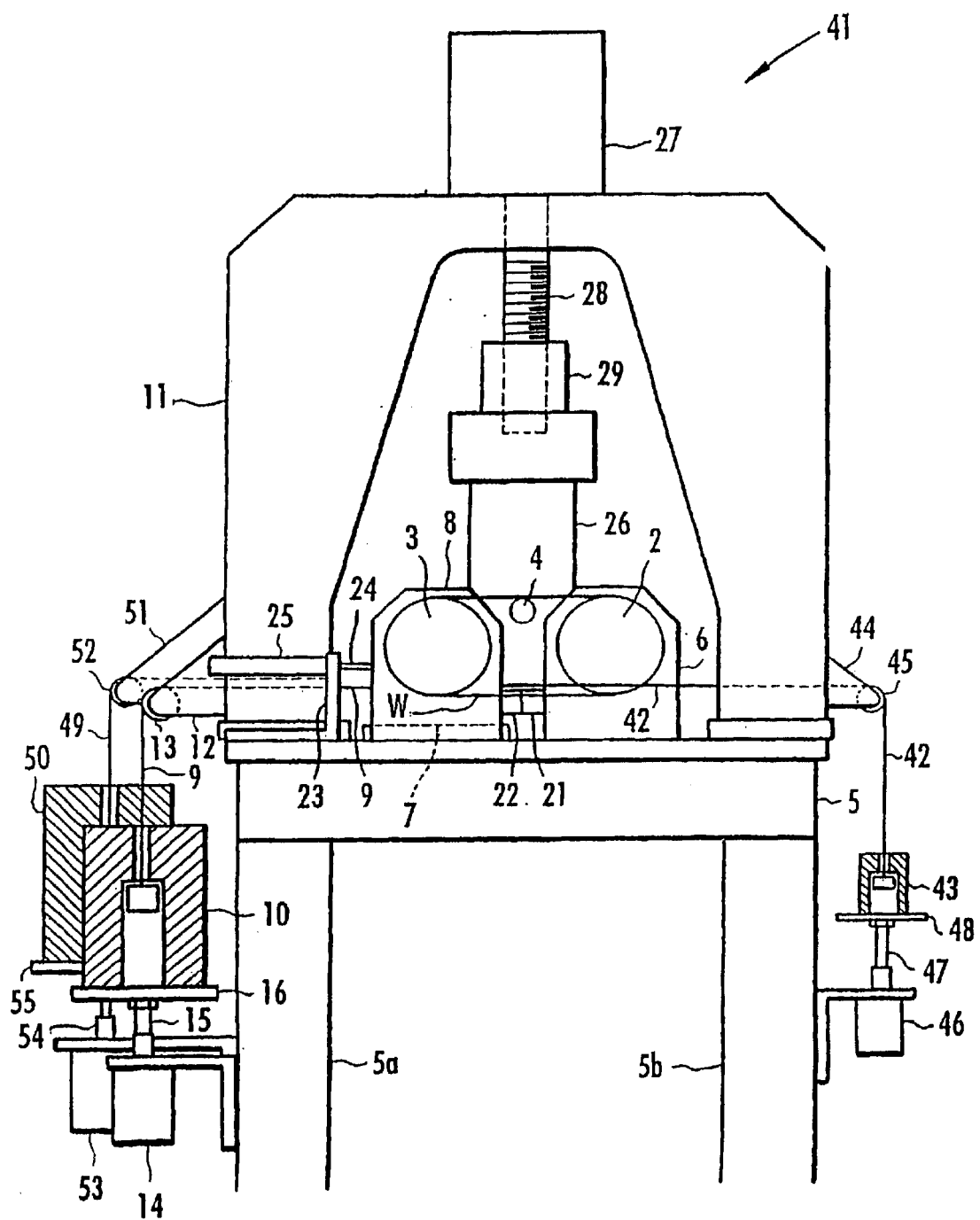
FIG. 3 is an elevational view of a circumferential length correcting apparatus according to another embodiment of the present invention.

For returning the correcting roller 4 from the upwardly displaced position to its original position, the circumferential length correcting apparatus 41 shown in FIG. 3 uses a third counterweight 50 connected to the driven roller support member 8 by a wire 49, rather than the first counterweight 10.

In the circumferential length correcting apparatus 41, specifically, the wire 49 extends horizontally away from the drive roller support member 6, and has an end connected to the drive roller support member 8 and an opposite end coupled to the third counterweight 49. The second counterweight 49 is vertically downwardly suspended by a roll 52 engaging the wire 49 and rotatably supported on a bracket 51 which is mounted on the proximal portion of the mount 11 that is vertically disposed on the base 5 near the driven roller 3.

When the correcting roller 3 is returned from the upwardly displaced position to its original position, the load (e.g., 30 kg) of the third counterweight 50 acts on the driven roller support member 8, displacing the driven roller 3 away from the drive roller 2. Therefore, the metal ring W remains under tension around the drive roller 2, the driven roller 3, and the correcting roller 4.

When the third counterweight 50 is borne upwardly by a table 55 mounted on the tip end of a piston rod 54 of a cylinder 53 which is mounted on the leg 5a of the base 5, the third counterweight 50 releases the driven roller support member 8 from being displaced under the load thereof.

Figure 4:
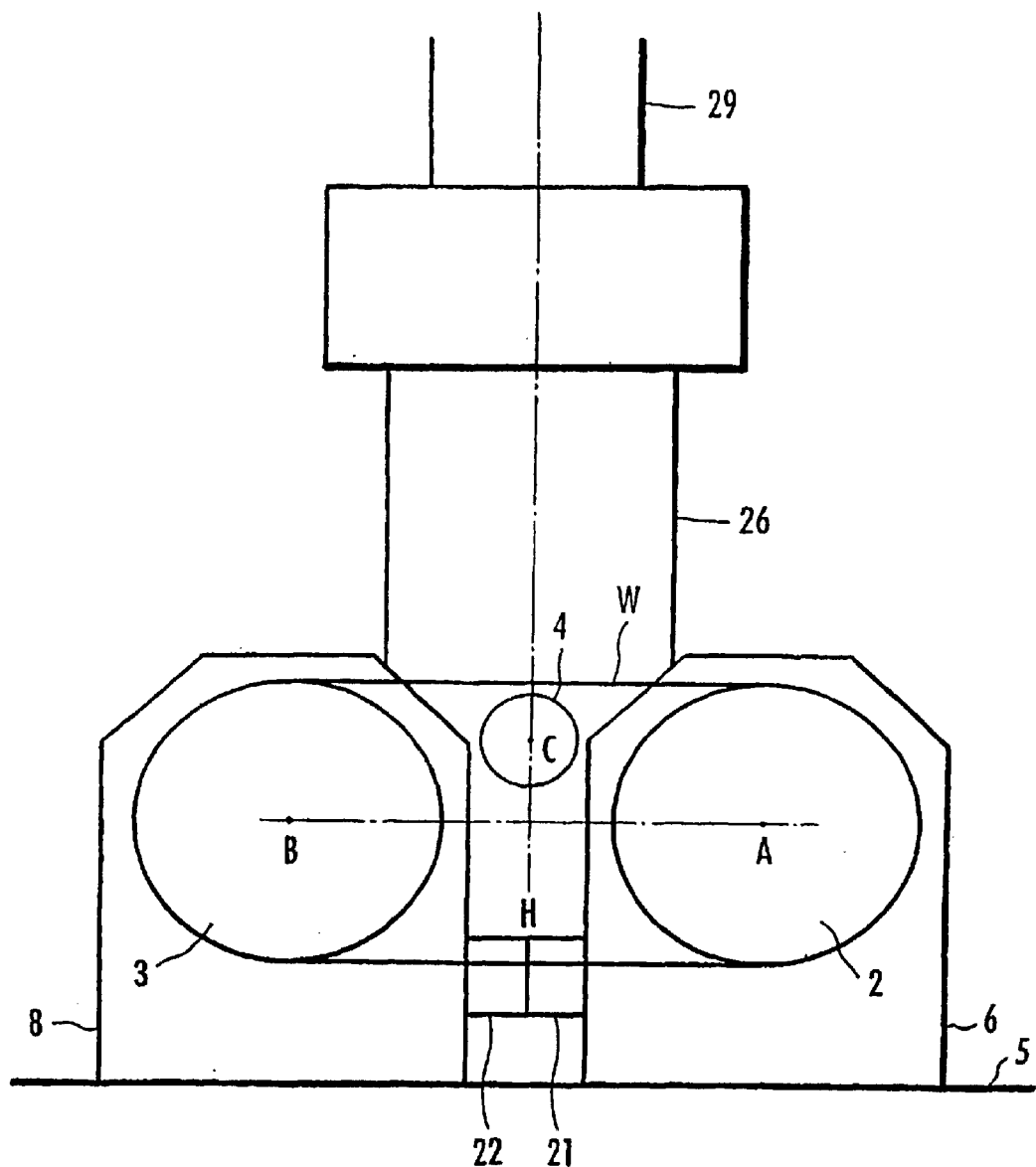
FIG. 4 is an enlarged view of a portion of the circumferential length correcting apparatus shown in FIGS. 1 and 3.
Figure 5:
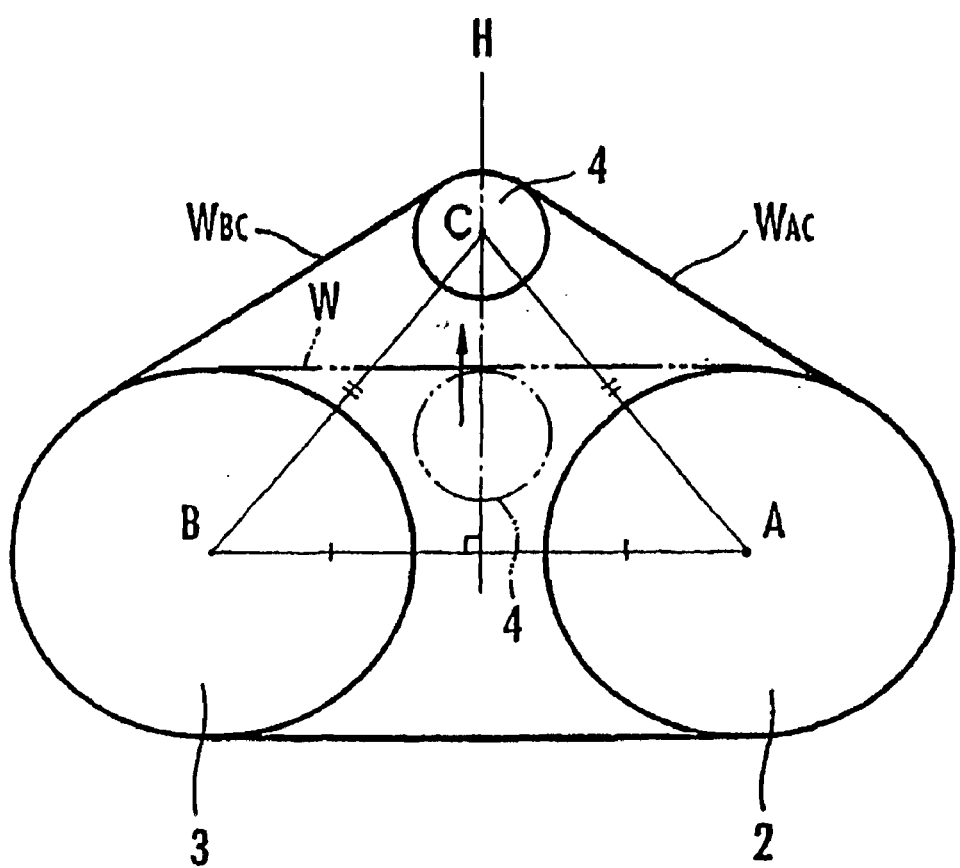
FIG. 5 is a schematic diagram showing the manner in which the circumferential length correcting apparatus shown in FIGS. 1 and 3 operate.

As shown at an enlarged scale in FIG. 4, the correcting roller support member 26 of the circumferential length correcting apparatus 1, 41 engages the spacers 21, 22 of the drive roller support member 6 and the driven roller support member 8 when the spacers 21, 22 abut against each other. The correcting roller 4 has its axis positioned on a vertical perpendicular bisector H of the interaxial line between the drive roller 2 and the driven roller 3 at the time the spacers 21, 22 abut against each other. Therefore, when the correcting roller 4 is progressively displaced upwardly, as shown in FIG. 5, the axis A of the drive roller 2, the axis B of the driven roller 3, and the axis C of the correcting roller 4 are related to each other at all times according to AC=BC.

As a consequence, when the metal ring W is trained around the drive roller 2, the driven roller 3, and the correcting roller 4, equal loads are applied to a portion $W_{AC}$ of the metal ring W which extends between the correcting roller 4 and the drive roller 2 and a portion $W_{BC}$ of the metal ring W which extends between the correcting roller 4 and the driven roller 3. Therefore, after the circumferential length of the metal ring W has been corrected, its width, wall thickness, and other dimensions are highly accurate.

Figure 6:
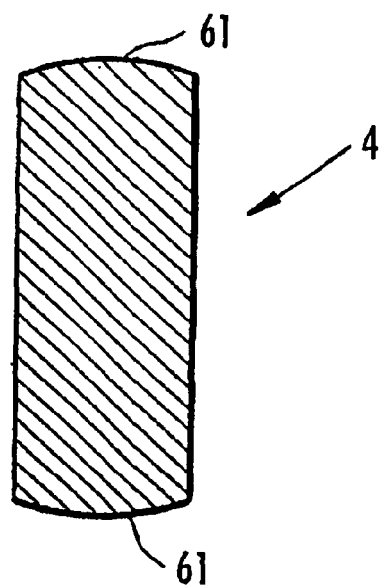
FIG. 6 is a cross-sectional view of a portion of the circumferential length correcting apparatus shown in FIGS. 1 and 3.

As shown in FIG. 6, the correcting roller 6 of the circumferential length correcting apparatus 1, 41 has an outer circumferential surface 61 which is of an arcuate transverse cross-sectional shape. When the correcting roller 6 is displaced by the servomotor 27 and the ball screw 28 to plastically deform the metal ring W, the arcuate shape of the outer circumferential surface 61 of the correcting roller 6 is transferred to the metal ring W, making the metal ring W arcuate in transverse cross section, as shown in FIG. 7.

Figure 7:
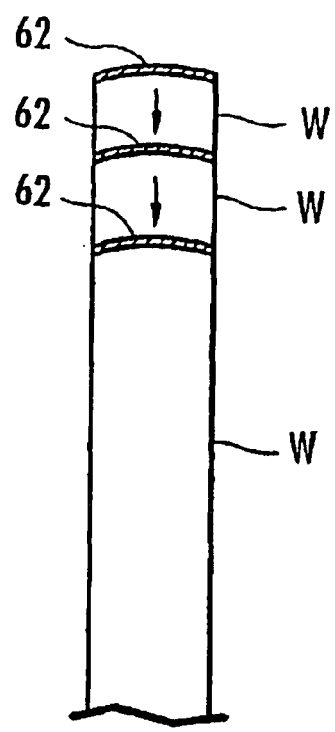
FIG. 7 is a cross-sectional view of a plurality of metal rings laminated together.

When a plurality of metal rings W, each having an arcuate transverse cross-sectional shape, are laminated together as indicated by the arrows in FIG. 7 to produce a metal belt for use in a continuously variable transmission, the metal rings W are easily kept in the laminated state because the metal rings W have their arcuate surfaces 62 held in mutual engagement.

Figure 8:
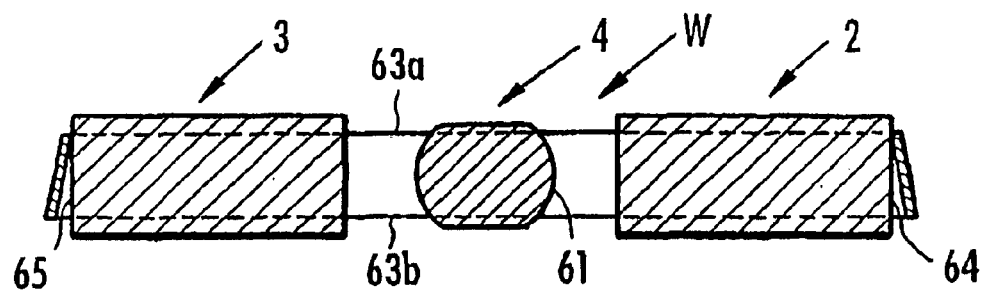
FIGS. 8(a) and 8(b) are cross-sectional views of a portion of the circumferential length correcting apparatus shown in FIG. 1.
Figure 8:
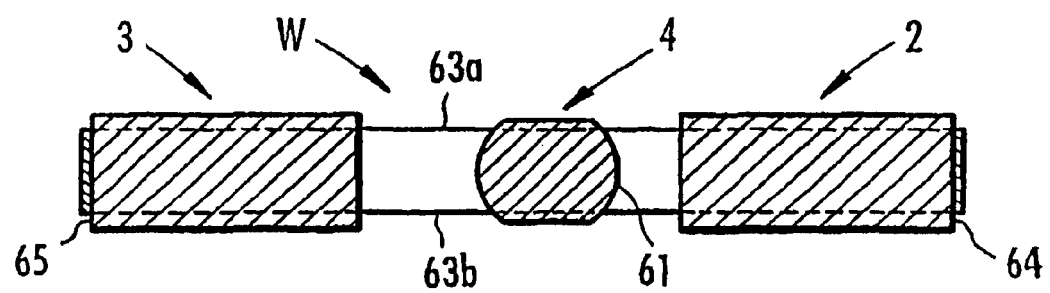

While the metal ring W is being processed up to the solution treatment process, the metal ring W may be deformed such that its laterally spaced circumferential edges 63a, 63b have different circumferential lengths, as shown in FIG. 8(a). The different circumferential lengths of the circumferential edges 63a, 63b are produced when the drum is deformed into a tapered shape at the time thin sheet of maraging steel or the like is welded into the drum or when the metal ring W is deformed into a tapered shape at the time the drum is sliced into the metal ring W. Alternatively, the different circumferential lengths occur due to the condition in which the metal ring W is held or different rates at which the metal ring W is cooled after the solution treatment process because the metal structure of the metal ring W heated in the solution treatment process is transformed. In FIG. 8(a), the different circumferential lengths of the circumferential edges 63a, 63b are shown as exaggerated.

If the metal ring W were corrected for its circumferential length with the different circumferential lengths of the circumferential edges 63a, 63b being left uncorrected, the difference between those different circumferential lengths may tend to increase in subsequent aging and nitriding processes. When the drive roller 2 is rotated for correcting the circumferential length of the metal ring W, the metal ring W is transversely displaced from the center of the correcting roller 4 toward a shorter circumferential edge thereof (corresponding to the circumferential edge 63a in FIG. 8(a)) along the arcuate shape of the outer circumferential surface 61 of the correcting roller 4. As a result, no desired arcuate shape may not be imparted transversely to the metal ring W which has been corrected for its circumferential length, or the metal ring W may be dislodged from the correcting roller 4 and may not be corrected for its circumferential length.

According to the present embodiment, while the drive roller 2 is being stopped against rotation, the driven roller 3 is displaced away from the drive roller 2 to apply a load to the metal ring W to make it plastically deformable. The load is greater than a load to apply tension to the metal ring W, but does not need to be large enough to correct the circumferential length of the metal ring W.

As a consequence, as shown in FIG. 8(b), the metal ring W is corrected into a shape along the outer circumferential surface 64 of the drive roller 2 and the outer circumferential surface 65 of the driven roller 3, making the circumferential lengths of the circumferential edges 63a, 63b equal to each other.

When the circumferential lengths of the circumferential edges 63a, 63b have been equalized, the drive roller 2 is rotated, the circumferential length of the metal ring W is measured, and the correcting roller 4 is displaced to apply a load to the metal ring W to correct its circumferential length by way of plastic deformation, thus correcting the circumferential length of the metal ring W into a given circumferential length, in the manner described above. The load applied to the metal ring W to correct its circumferential length is greater than the load applied thereto to eliminate the difference between the circumferential lengths of the circumferential edges 63a, 63b.

When the circumferential lengths of the circumferential edges 63a, 63b of the metal ring w are different from each other, the different circumferential lengths may be corrected by an apparatus having correcting roller tilting means shown in FIGS. 9 through 13.

Figure 9:
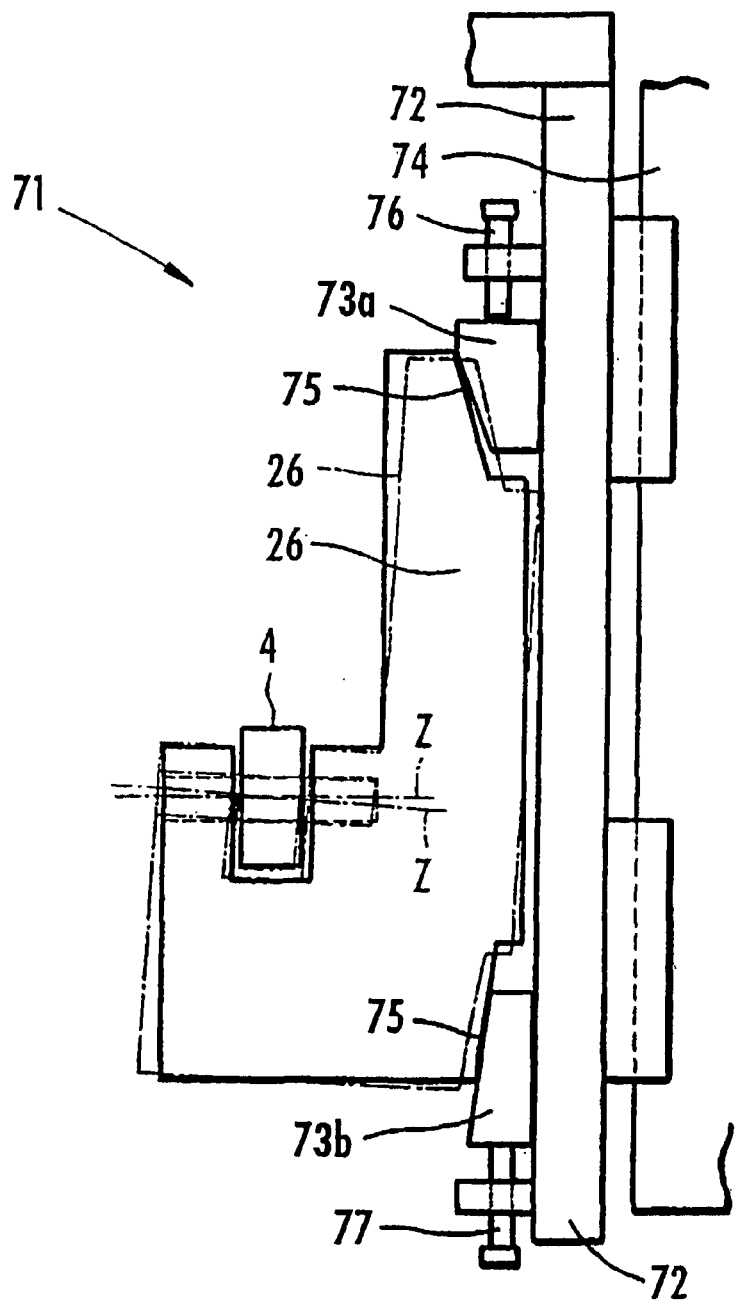
FIG. 9 is a view showing a correcting roller tilting means.
Figure 10:
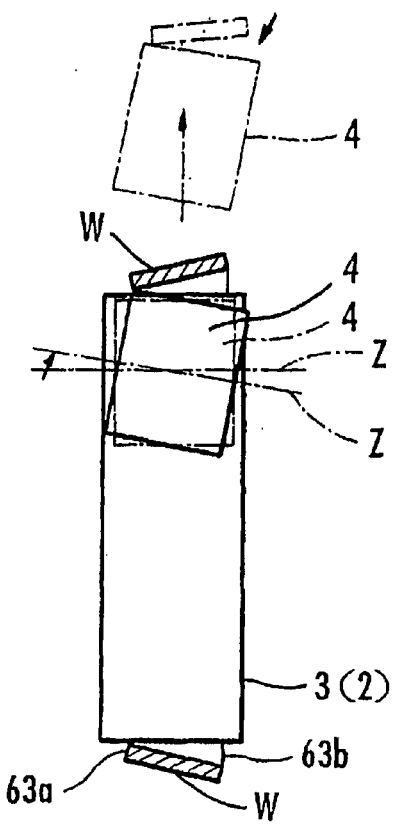
FIGS. 10(a) through 10(c) are views showing the manner in which the circumferential length correcting apparatus with the correcting roller tilting means operates.
Figure 10:
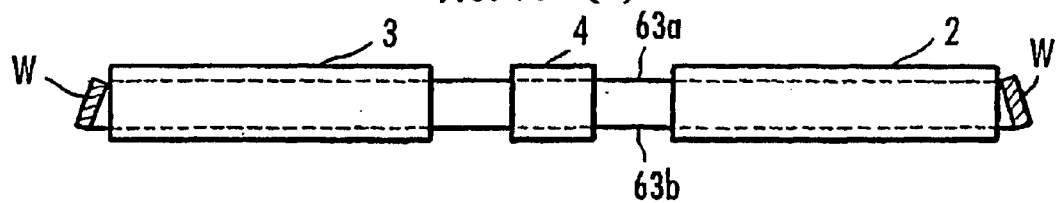
Figure 10:
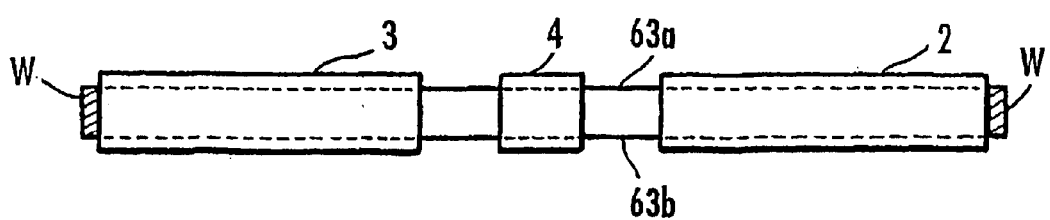

The apparatus shown in FIG. 9 is a modification of the circumferential length correcting apparatus 1, 41. A correcting roller tilting means 71 comprises a moving member 72 coupled to the ball screw 28 shown in FIGS. 1 and 3, a correcting roller support member 26 tiltably mounted on the moving member 72, the correcting roller 4 being rotatably mounted on the correcting roller support member 26, and a pair of tilting members 73a, 73b for tilting the correcting roller support member 26. The moving member 72 is slidable along a vertical guide rail 74, so that the correcting roller support member 26 can be vertically displaced by the ball screw 28 through the moving member 72.

The tilting members 73a, 73b are wedge-shaped in vertical cross section and have respective slanted surfaces 75 on one side thereof. The tilting members 73a, 73b can be wedged, i.e., inserted under pressure, between the moving member 72 and the correcting roller support member 26 by pressing screws 76, 77 that are supported on the moving member 72. The slanted surfaces 75 are slidably pressed against the correcting roller support member 26 to tilt the correcting roller support member 26 with respect to the moving member 72.

When the distance that the tilting members 73a, 73b are inserted is adjusted by the respective pressing screws 76, 77, the correcting roller support member 26 can be tilted through a desired angle with respect to the moving member 72. When the correcting roller support member 26 is tilted, the axis Z of the correcting roller 4 rotatably mounted on the correcting roller support member 26 is vertically tilted.

In the circumferential length correcting apparatus 1, 41 which incorporate the correcting roller tilting means 71, the difference between the different circumferential lengths of the circumferential edges 63a, 63b of the metal ring W is measured, recognizing an inclination of the metal ring W as shown in FIG. 10(a), i.e., a radially inward inclination of the metal ring W from the circumferential edge 63b toward the circumferential edge 63a.

Then, as shown in FIG. 9, the distance that the tilting members 73a, 73b are inserted between the moving member 72 and the correcting roller support member 26 is adjusted by the pressing screws 76, 77, thereby tilting the axis Z of the correcting roller 4 to match the inclination of the metal ring W.

Thereafter, the metal ring W is trained around the drive roller 2, the driven roller 3, and the correcting roller 4. At this time, as shown in the side elevational view of FIG. 10(a), the metal ring W is trained around the drive roller 2, the driven roller 3, and the correcting roller 4 so as to direct the inclination of the metal ring W obliquely across the tilted axis Z of the correcting roller 4. As shown in the plan view of FIG. 10(b), the metal ring W trained around the drive roller 2, the driven roller 3, and the correcting roller 4 is kept under tension, and while the drive roller 2 is being rotated, the circumferential length of the metal ring W is measured, and then the correcting roller 4 is displaced to apply a load to the metal ring W to correct its circumferential length by way of plastic deformation, thus correcting the circumferential length of the metal ring W into a given circumferential length.

Because the axis Z of the correcting roller 4 is tilted obliquely across the inclination of the metal ring W, as shown in the plan view of FIG. 10(c), the inclination of the metal ring W due to the different circumferential lengths of the circumferential edges 63a, 63b thereof is eliminated, so that the circumferential length of the metal ring W can be corrected highly accurately.

Figure 11:
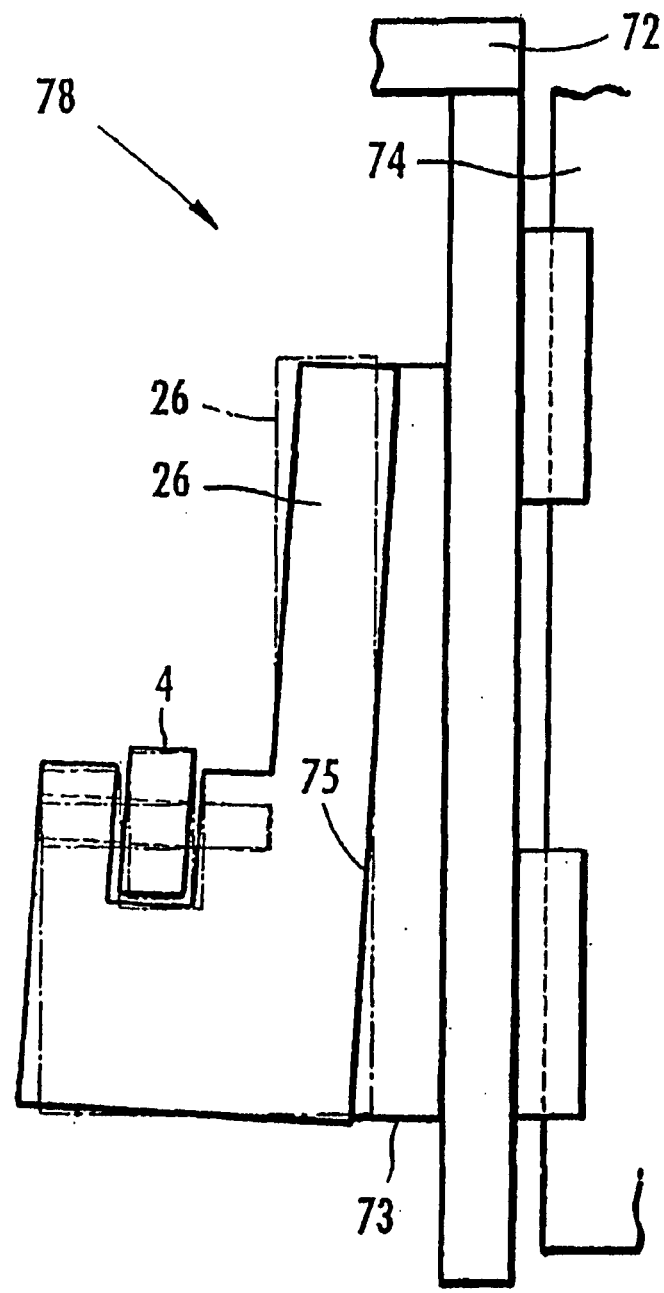
FIG. 11 is a view showing another correcting roller tilting means.

The correcting roller tilting means 71 shown in FIG. 9 may be replaced with a correcting roller tilting means 78 shown in FIG. 11 which has a single tilting member 73 interposed between the moving member 72 and the correcting roller support member 26. The tilting member 73 is wedge-shaped in vertical cross section and has a slanted surface 75 on one side thereof for tilting the correcting roller support member 26 with respect to the moving member 72.

Figure 12:
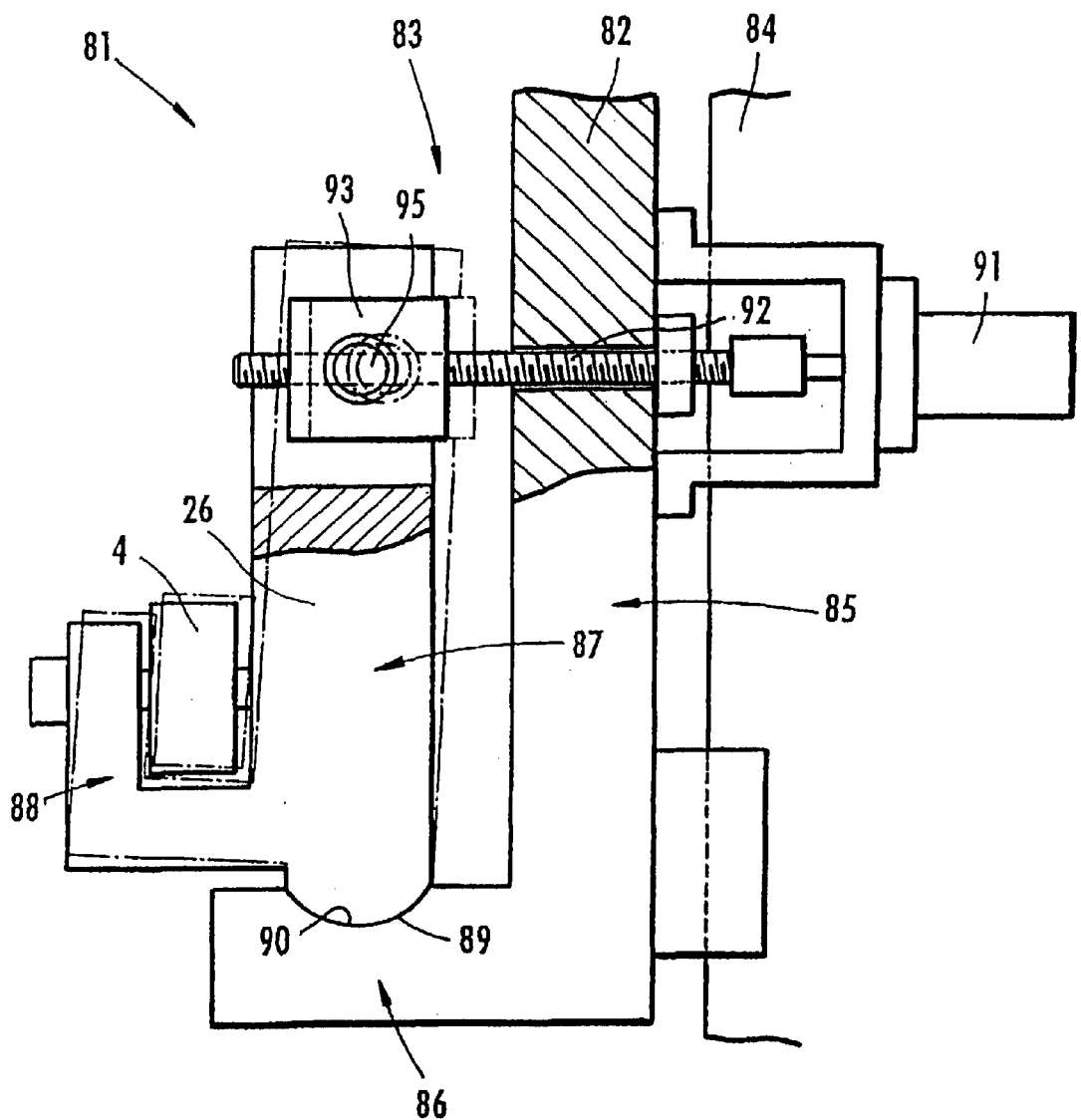
FIG. 12 is a view showing still another correcting roller tilting means.

Alternatively, the correcting roller tilting means 71, 78 shown in FIGS. 9 and 11 may be replaced with a correcting roller tilting means 81 shown in FIG. 12.

As shown in FIG. 12, the correcting roller tilting means 81 comprises a moving member 82 coupled to the ball screw 28 shown in FIGS. 1 and 3, a correcting roller support member 26 swingably mounted on the moving member 82, the correcting roller 4 being rotatably mounted on the correcting roller support member 26, and a swinging means 83 for swinging the correcting roller support member 26.

The moving member 82 comprises a first base 85 slidable along a pair of vertically extending guide rails (one shown in FIG. 12), and a bearing arm 86 extending horizontally from an end (lower end in FIG. 12) of the first base 85.

The correcting roller support member 26 comprises a second base 87 extending along the first base 85 of the moving member 82, and a correcting roller support bracket 88 on the lower end of the second base 87 and on which the correcting roller 4 is rotatably supported. The correcting roller support bracket 88 has an abutment 89 on its lower end which has a semicircular cross-sectional shape. The abutment 89 is borne by the bearing arm 86 that has a recess 90 in which the abutment 89 is seated. The second base 87 of correcting roller support member 26 is swingable about the abutment 89 in directions toward and away from the first base 85 of the moving member 82.

Figure 13:
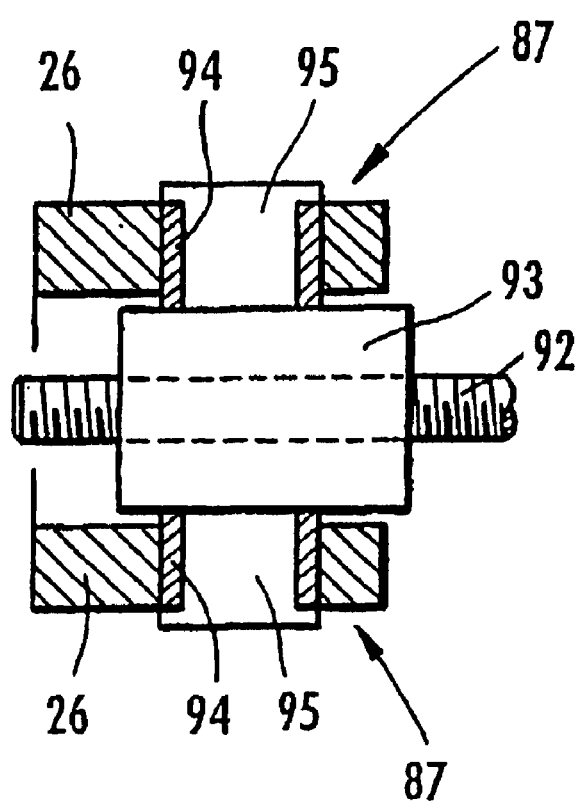
FIG. 13 is a cross-sectional view of the correcting roller tilting means shown in FIG. 12.

The swinging means 83 comprises a servomotor 91 mounted on the first base 85 of the moving means 82, and a ball screw 92 coaxially coupled to the rotatable shaft of the servomotor 91. The ball screw 92 is rotatably supported by the first base 85 of the moving member 82 and extends horizontally therethrough, and is coupled to the second base 87 of the correcting roller support member 26 by a threaded member 93 that is threaded over the ball screw 92. As shown in FIG. 13, the threaded member 93 is angularly movably supported on the second base 87 by a pair of pivot shafts 95 that are swingably mounted in the second base 87 by respective inserts 94 such as ball bushings or the like. The pivot shafts 95 and the inserts 94 allow the threaded member 93 to swing smoothly in response to swinging movement of the second base 87.

Figure 14:
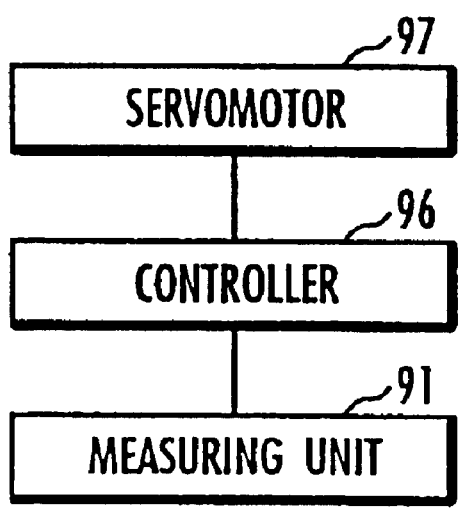
FIG. 14 is a block diagram of the correcting roller tilting means shown in FIG. 12.
Figure 15:
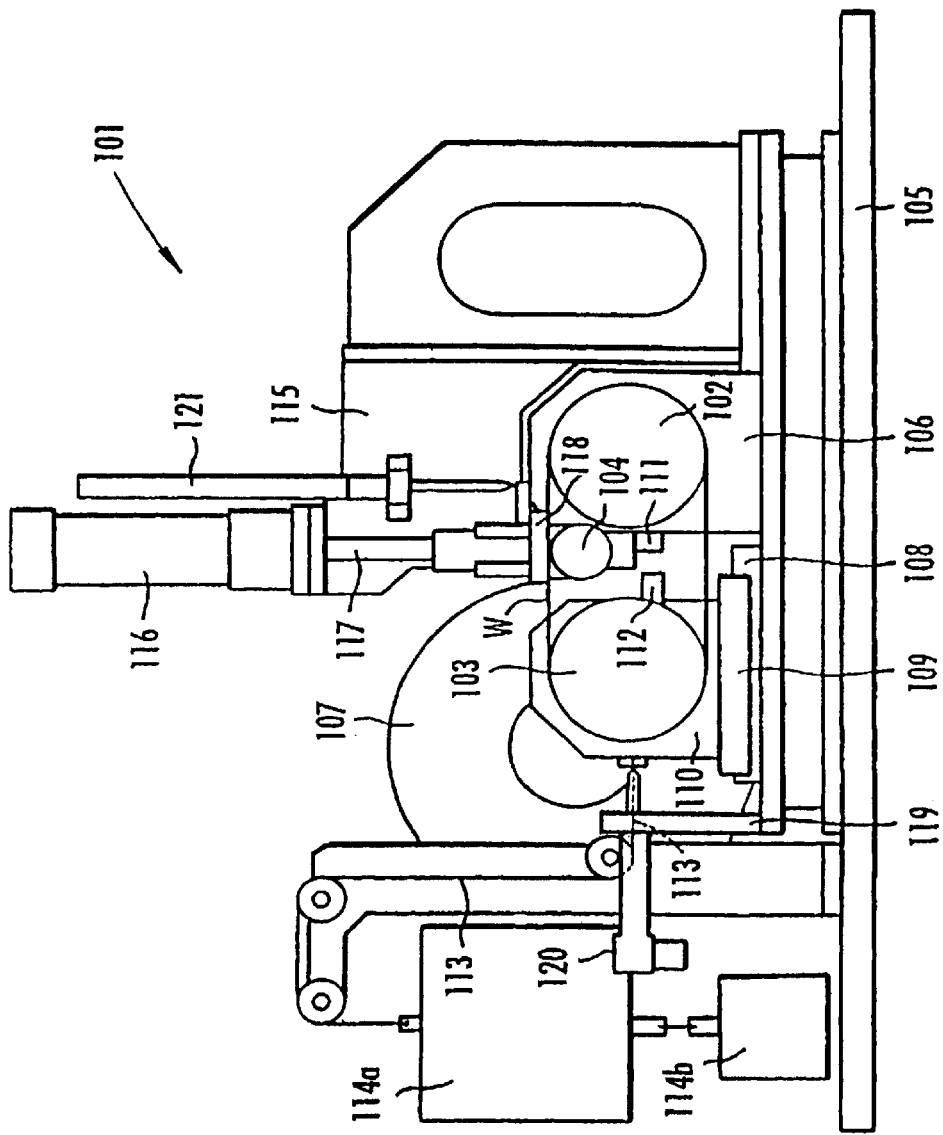
FIG. 15 is an elevational view of a conventional circumferential length correcting apparatus.

The swinging means 83 also has a swinging controller 96 shown in FIG. 14. The swinging controller 96 is connected to the servomotor 91 and a measuring unit 97 for measuring the difference between the circumferential lengths of the circumferential edges 63a, 63b. The swinging controller 96 controls operation of the servomotor 91 based on the difference between the circumferential lengths which is measured by the measuring unit 97.

The circumferential length correcting apparatus 1, 41 which incorporate the correcting roller tilting means 81 operate as follows: First, the measuring unit 97 measures the difference between the different circumferential lengths of the circumferential edges 63a, 63b of the metal ring W, recognizing an inclination of the metal ring W as shown in FIG. 10(a), i.e., a radially inward inclination of the metal ring W from the circumferential edge 63b toward the circumferential edge 63a. The direction in and the amount by which the metal ring W is inclined, as measured by the measuring unit 97 are entered into the swinging controller 96, which energizes the servomotor 91 to tilt the axis Z of the correcting roller 4 in a direction that counters the inclination of the metal ring W. Specifically, the rotatable shaft of the servomotor 91 is rotated a given number of revolutions by the swinging controller 96, rotating the ball screw 92 to cause the threaded member 93 to tilt the second base 87 of the correcting roller support member 26. As a result, as shown in FIG. 21, the axis Z of the correcting roller 4 is tilted as indicated by the dot-and-dash lines.

Then, the metal ring W is trained around the drive roller 2, the driven roller 3, and the correcting roller 4 so as to direct the inclination of the metal ring W obliquely across the tilted axis Z of the correcting roller 4. The metal ring W trained around the drive roller 2, the driven roller 3, and the correcting roller 4 is kept under tension, and while the drive roller 2 is being rotated, the circumferential length of the metal ring W is measured, and then the correcting roller 4 is displaced to apply a load to the metal ring W to correct its circumferential length by way of plastic deformation, thus correcting the circumferential length of the metal ring W into a given circumferential length.

Inasmuch as the axis Z of the correcting roller 4 is tilted obliquely across the inclination of the metal ring W, the inclination of the metal ring W due to the different circumferential lengths of the circumferential edges 63a, 63b thereof is eliminated, so that the circumferential length of the metal ring W can be corrected highly accurately.

The action to train the metal ring W around drive roller 2, the driven roller 3, and the correcting roller 4 and the action to tilt the correcting roller 4 may be made one after another or simultaneously.

INDUSTRIAL APPLICABILITY

The apparatus for correcting the circumferential length of a metal ring according to the present invention can be used in an application to automatically correct the circumferential length of a metal ring for use as an element of a metal belt for a continuously variable transmission.

What is claimed is:

1. An apparatus for correcting the circumferential length of a metal ring, comprising:

a drive roller and a driven roller positionable closely to each other for training a metal ring therearound;

a correcting roller disposed between said drive roller and said driven roller;

first displacement applying means for displacing said drive roller and said driven roller away from each other when the metal ring is trained around said drive roller, said driven roller, and said correcting roller;

spacing means for spacing said drive roller and said driven roller a predetermined distance from each other when said drive roller and said driven roller are released from being displaced by said first displacement applying means;

second displacement applying means for displacing said correcting roller in a direction perpendicular to the direction in which said drive roller and said driven roller are displaced by said first displacement applying means and also to extend said metal ring, thereby to correct the circumferential length of said metal ring while said drive roller and said driven roller are being spaced said predetermined distance from each other; and third displacement applying means for displacing said drive roller and said driven roller toward each other when said drive roller, said driven roller, and said correcting roller are released from being displaced by said first displacement applying means and said second displacement applying means.

2. An apparatus according to claim 1, wherein said second displacement applying means comprises means for releasing said correcting roller to return the correcting roller to an original position thereof after having displaced said correcting roller in the direction perpendicular to the direction in which said drive roller and said driven roller are displaced by said first displacement applying means and also to extend said metal ring, thereby to correct the circumferential length of said metal ring, wherein said first displacement applying means comprises means for displacing said drive roller and said driven roller away from each other to keep the metal ring trained around said drive roller, said driven roller, and said correcting roller when said second displacement applying means releases said correcting roller to return the correcting roller to the original position thereof, and releasing said drive roller and said driven roller from being displaced away from each other after said correcting roller is returned to the original position thereof, and wherein said third displacement applying means comprises means for displacing said drive roller and said driven roller toward each other after said correcting roller is released from being displaced by said second displacement applying means.

3. An apparatus according to claim 1, wherein said first displacement applying means comprises a wire having one end connected to one of said drive roller and said driven roller and extending horizontally from the other of said drive roller and said driven roller, a first counterweight connected to the other end of said wire and suspended vertically by a roll engaging said wire for displacing said drive roller or said driven roller through said wire, and a table for bearing said first counterweight upwardly to release said drive roller or said driven roller from being displaced by said first counterweight.

4. An apparatus according to claim 1, further comprising a drive roller support member on which said drive roller is rotatably supported and a driven roller support member on which said driven roller is rotatably supported, said spacing means comprising a pair of abutments projecting respectively from said drive roller support member and said driven roller support member toward each other for abutment against each other.

5. An apparatus according to claim 1, wherein said second displacement applying means comprises a ball screw connected to said correcting roller for displacing said correcting roller in the direction perpendicular to the direction in which said drive roller and said driven roller are displaced by said first displacement applying means and also to extend said metal ring, and a servomotor for rotating said ball screw about its own axis.

6. An apparatus according to claim 1, wherein said third displacement applying means comprises a cylinder having a piston rod connected to said drive roller or said driven roller for displacing one of said drive roller and said driven roller toward the other thereof.

7. An apparatus according to claim 1, wherein said third displacement applying means comprises a wire having one end connected to one of said drive roller and said driven roller and extending horizontally toward the other of said drive roller and said driven roller, a second counterweight connected to the other end of said wire and suspended vertically by a roll engaging said wire for displacing said drive roller or said driven roller toward the other thereof through said wire, and a table for bearing said second counterweight upwardly to release said drive roller or said driven roller from being displaced by said second counterweight.

8. An apparatus according to claim 1, further comprising braking means for preventing said drive roller and said driven roller from being abruptly moving toward each other when said metal ring is extended by said second displacement applying means.

9. An apparatus according to claim 8, wherein said third displacement applying means comprises a cylinder having a piston rod connected to said drive roller or said driven roller for displacing one of said drive roller and said driven roller toward the other thereof, said braking means comprising said cylinder.

10. An apparatus according to claim 8, wherein said third displacement applying means comprises a wire having one end connected to one of said drive roller and said driven roller and extending horizontally toward the other of said drive roller and said driven roller, a second counterweight connected to the other end of said wire and suspended vertically by a roll engaging said wire for displacing said drive roller or said driven roller toward the other thereof through said wire, and a table for bearing said second counterweight upwardly to release said drive roller or said driven roller from being displaced by said second counterweight, said braking means comprising a wire having one end connected to the roller to which said second counterweight is connected and extending horizontally from the other roller, a third counterweight connected to the other end of said wire and suspended vertically by a roll engaging said wire for braking said roller to which said second counterweight is connected and said other roller against abrupt movement toward each other, and a table for bearing said third counterweight upwardly to release the rollers from being braked by said third counterweight.

11. An apparatus according to claim 1, wherein said second displacement applying means comprises means for displacing said correcting roller along a vertical perpendicular bisector of an interaxial line between said drive roller and said driven roller which are spaced the predetermined distance by said spacing means.

12. An apparatus according to claim 1, further comprising a first calculating unit for calculating the actual circumferential length of said metal ring to be corrected for the circumferential length thereof, a selecting unit for selecting a corrected standard circumferential length corresponding to the actual circumferential length of said metal ring which is calculated by said first calculating unit, and a second calculating unit for comparing the actual circumferential length of said metal ring and the selected corrected standard circumferential length with each other and calculating a corrective quantity required to correct the circumferential length of said metal ring into said corrected standard circumferential length, wherein said second displacement applying means comprises means for displacing said correcting roller according to the corrective quantity calculated by said second correcting unit.

13. An apparatus according to claim 1, further comprising a calculating unit for calculating the actual circumferential length of said metal ring to be corrected for the circumferential length thereof, and a selecting unit for selecting a corrected standard circumferential length corresponding to the actual circumferential length of said metal ring which is calculated by said calculating unit, wherein said first displacement applying means comprises means for releasing said drive roller and said driven roller from being displaced away from each other when the actual circumferential length of said metal ring as calculated by said calculating unit falls out of a range of the corrected standard circumferential length selected by said selecting unit.

14. An apparatus according to claim 1, wherein said correcting roller has an outer circumferential surface having an arcuate cross-sectional shape which is convex at a center thereof in a transverse direction thereof.

15. An apparatus according to claim 1, further comprising correcting roller tilting means for tilting the axis of said correcting roller depending on the difference between opposite circumferential edges of said metal ring.

16. An apparatus according to claim 15, wherein said correcting roller tilting means comprises a moving member coupled to said second displacement applying means for movement in the direction to extend said metal ring, a correcting roller support member tiltably mounted on said moving member, said correcting roller being rotatably supported on said correcting roller support member, and a tilting member inserted between said moving member and said correcting roller support member and having a slanted surface for tiling the axis of said correcting roller.

17. An apparatus according to claim 15, wherein said correcting roller tilting means comprises a moving member coupled to said second displacement applying means for movement in the direction to extend said metal ring, a correcting roller support member tiltably mounted on said moving member, said correcting roller being rotatably supported on said correcting roller support member, and swinging means for swinging said correcting roller support member to tilt the axis of said correcting roller.

18. An apparatus according to claim 17, wherein said correcting roller support member has a base extending in the direction to extend said metal ring, said correcting roller being rotatably supported on said base, and a cross-sectionally arcuate abutment disposed on one end of said base, and said moving member comprises a base extending in the direction to extend said metal ring, and a bearing member joined to said base and having a recess for bearing said abutment which is seated therein, and wherein said swinging means comprises means for moving the opposite end of said base of said correcting roller support member toward or away from the base of said moving member thereby to swing said correcting roller support member.

19. An apparatus according to claim 18, wherein said swinging means comprises a ball screw rotatably supported by the base of said moving member and extending in a direction to move the opposite end of said base of said correcting roller support member toward or away from the base of said moving member, a threaded member pivotally supported by the base of said correcting roller support member and threaded over said ball screw, a servomotor for rotating said ball screw about its own axis to cause said threaded member to swing said correcting roller support member, and a controller for controlling said servomotor to tilt the axis of said correcting roller depending on the difference between the opposite circumferential edges of said metal ring.

* * * * *